UNITED STATES PATENT OFFICE.

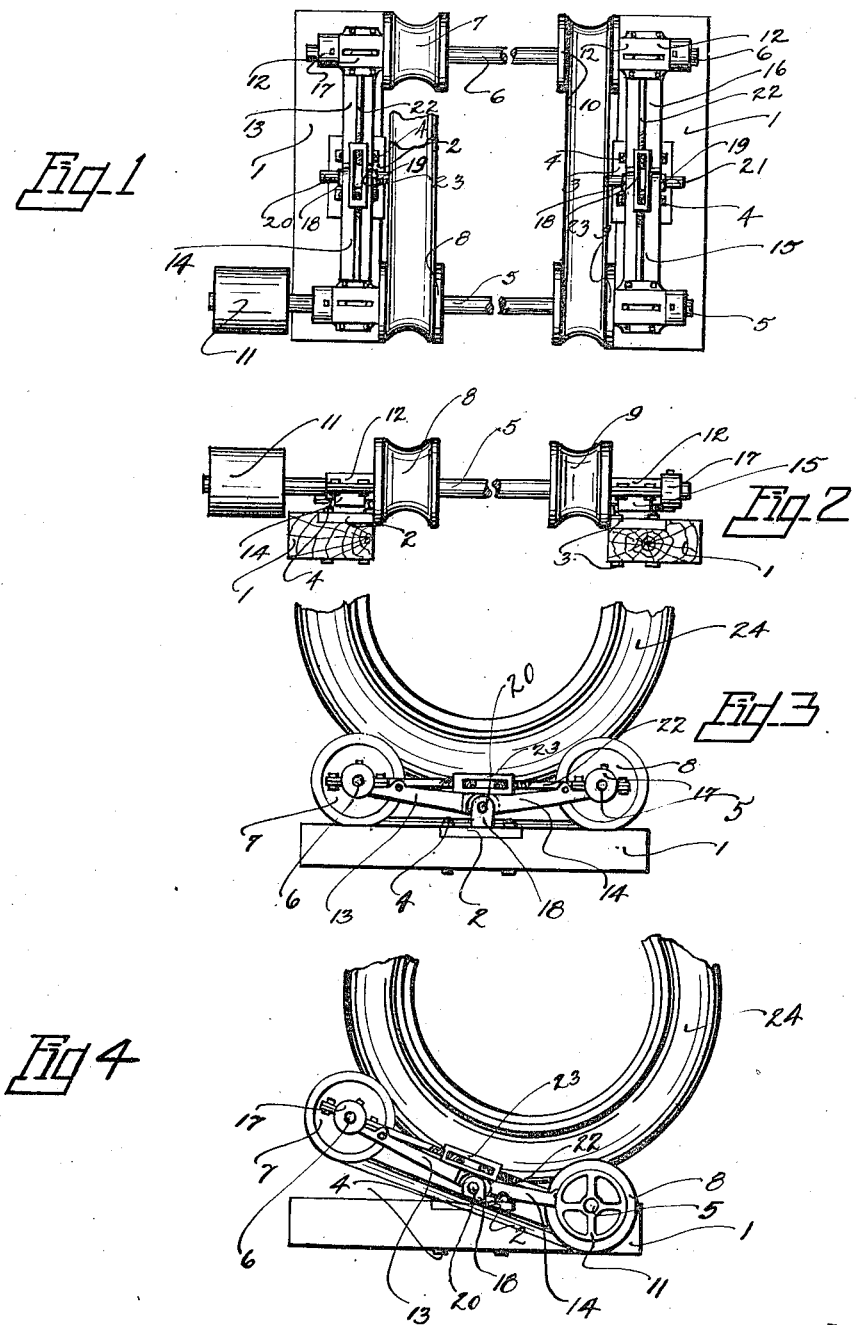

PHILIP C. GRIMM AND JAMES A. VAN SICKLE, OF LINCOLN, WASHINGTON.

AUTOMOBILE-POWER JACK.

1,252,688.

Specification of Letters Patent.    Patented Jan. 8, 1918.

Application filed July 14, 1917.    Serial No. 180,556.

*To all whom it may concern:*

Be it known that we, PHILIP C. GRIMM and JAMES A. VAN SICKLE, citizens of the United States, residing at Lincoln, in the county of Lincoln and State of Washington, have invented certain new and useful Improvements in Automobile-Power Jacks, of which the following is a specification.

The present invention relates to an improved automobile power jack, designed especially for use in furnishing power for saw mills, and other general farming implements and machinery.

The primary object of the invention is the provision of a comparatively inexpensive, durable, and practical and efficient power transmitting device or jack to be operated by the driving wheels of an automobile and upon which the automobile may be mounted with facility and with equal facility be dismounted therefrom when not needed.

The invention consists essentially in certain novel combinations and arrangements of parts whereby the jack may be tilted to mount or dismount the automobile and whereby the device may be adjusted for automobile wheels of different size.

In the accompanying drawings we have illustrated one complete example of the physical embodiment of our invention constructed and arranged according to the best mode we have so far devised for the practical application of the principles of our invention.

Figure 1 is a top plan view of a jack embodying our invention.

Fig. 2 is a side elevation of the jack in operative position.

Fig. 3 is an end view of the device.

Fig. 4 is a side elevation of the jack in position to mount or dismount the automobile.

In the preferred embodiment of the invention an oscillatable frame for supporting the wheels of the automobile is supported on the pair of blocks 1, 1 bearings 2 and 3 being secured to the blocks by bolts 4. The blocks are spaced apart and are spanned by a pair of shafts 5 and 6 upon which are located the four grooved pulleys or wheels 7, 8, 9, 10, and the shaft 5, which is the driving or operating shaft is provided with a driving pulley 11 over which a belt may pass for conveying power to machinery as described.

The journal bearings 12 for the shafts are fashioned at the outer ends of pairs of pivoted arms 13, 14, and 15, 16, and collars 17 are fixed as by set screws, on the shafts to secure the parts against displacement.

The pairs of arms at their inner connected ends are formed with perforated ears as 18, 19, and through these perforated ears the pivot pins 20 and 21 are passed, the pins also passing through the bearings 2, 3, so that the entire frame may oscillate on the pins, or the pairs of arms may swing on the pins if desired. The arms incline upwardly from the pivot points, and the outer ends of the arms, in pairs, are connected by the sectional adjusting bars 22, and the inner ends of the sections of the bars are connected by a turn buckle 23.

Thus, when it is desired to increase or decrease the distance between the two shafts and their wheels the turn buckles may be turned on the threaded ends of the adjusting bars for this purpose, assuming of course that the arms are free to turn on their pivot pins.

The automobile wheel is indicated at 24, as resting on the two wheels 7 and 8, the shaft 5 of wheel 7 being the driving shaft, and the revolutions of the wheel 24, which is in close frictional contact with the grooved pulley wheels, drives the driving shaft as will be understood.

In order to mount the automobile, the oscillatable frame is turned to position in Fig. 4 and the car driven up on the frame, the forward wheels of the car being chocked to hold the automobile steady, and the frame is preferably held in position of Fig. 2, while under operation.

What we claim is:—

1. The combination in an automobile power jack with supporting blocks and bearings thereon, of parallel sectional arms each having central pivoted hinged joints in the bearings, shafts connecting the ends of said arms and operating wheels on said shafts, and means for holding said sectional arms as rigid members.

2. The combination in an automobile power jack with supporting blocks and bearings thereof, of an oscillatable frame comprising parallel sectional arms each having central pivoted hinged joints in the bearings, shafts connecting the free ends of the arms and operating wheels on the shafts, connecting bars on the sectional members of the arms, and turn buckles connecting these arms, for the purpose described.

In testimony whereof we affix our signatures.

PHILIP C. GRIMM.
JAMES A. VAN SICKLE.